(12) United States Patent
Junkins et al.

(10) Patent No.: US 10,838,419 B2
(45) Date of Patent: Nov. 17, 2020

(54) METHOD AND APPARATUS FOR CONTROLLED OMNIDIRECTIONAL MOVEMENT OF PAYLOADS

(71) Applicant: The Texas A&M University System, College Station, TX (US)

(72) Inventors: John L. Junkins, College Station, TX (US); Manoranjan Majji, College Station, TX (US); Jeremy Davis, Richardson, TX (US); James Doebbler, Wylie, TX (US)

(73) Assignee: The Texas A&M University System, College Station, TX (US)

( * ) Notice: Subject to any disclaimer, the term of this patent is extended or adjusted under 35 U.S.C. 154(b) by 262 days.

(21) Appl. No.: 15/914,366

(22) Filed: Mar. 7, 2018

(65) Prior Publication Data

US 2018/0259962 A1 Sep. 13, 2018

Related U.S. Application Data (60) Provisional application No. 62/468,254, filed on Mar. 7, 2017.

(51) Int. Cl.
*G05D 1/02* (2020.01)
*B25J 5/00* (2006.01)
(Continued)

(52) U.S. Cl.
CPC ............ *G05D 1/0212* (2013.01); *B25J 5/007* (2013.01); *B25J 9/162* (2013.01); *B25J 9/1666* (2013.01);
(Continued)

(58) Field of Classification Search
CPC .. G05D 1/0212; G05D 1/0297; G05D 1/0238; G05D 2201/0205; G05D 2201/0216; B60B 33/0002; B60B 33/0021; B60B 33/0023; B60B 33/0042; B25J 9/1666; B25J 9/1694; B25J 9/162; B25J 5/007
See application file for complete search history.

(56) References Cited

U.S. PATENT DOCUMENTS 6,540,039 B1 4/2003 Yu et al.
2009/0299525 A1* 12/2009 Takahashi ............. B60B 19/003
700/258

OTHER PUBLICATIONS

Han et al., Construction of an Omnidirectional Mobile Robot Platform Based on Active Dual-Wheel Caster Mechanisms and Development of a Control Simulator, 2000, Journal of Intelligent and Robotic Systems 29: pp. 257-275, 2000. (Year: 2000).*

* cited by examiner

*Primary Examiner* — Thomas Ingram
(74) *Attorney, Agent, or Firm* — Winstead PC (57) ABSTRACT

A payload platform includes a platform and a castor assembly coupled to the platform. The castor assembly includes a body, a first wheel coupled to the body, and a second wheel coupled to the body. The first wheel and the second wheel are individually actuatable. A sensor is coupled to the body. A control unit is operably coupled to the sensor and operably coupled to the first wheel and to the second wheel. The sensor detects an area surrounding the platform, determines presence of obstacles, and transmits a signal to the control unit corresponding to the area surrounding the platform. The control unit directs the first wheel and the second wheel to rotate in a prescribed manner so as to achieve a prescribed movement of the platform.

20 Claims, 9 Drawing Sheets

(51) Int. Cl.
  *B25J 9/16* (2006.01)
  *B60B 33/00* (2006.01)
(52) U.S. Cl.
  CPC ......... *B25J 9/1694* (2013.01); *B60B 33/0002* (2013.01); *B60B 33/0021* (2013.01); *B60B 33/0023* (2013.01); *B60B 33/0042* (2013.01); *G05D 1/0238* (2013.01); *G05D 1/0297* (2013.01); *G05B 2219/31008* (2013.01); *G05D 2201/0205* (2013.01); *G05D 2201/0216* (2013.01); *Y10S 901/01* (2013.01); *Y10S 901/47* (2013.01)

METHOD AND APPARATUS FOR CONTROLLED OMNIDIRECTIONAL MOVEMENT OF PAYLOADS

CROSS-REFERENCE TO RELATED APPLICATIONS

This application claims priority to and incorporates by reference the disclosure of U.S. Provisional Patent Application No. 62/468,254, filed on Mar. 7, 2017.

BACKGROUND

Technical Field

The present disclosure relates generally to mobility systems for payloads and more particularly, but not by way of limitation to mobility systems utilizing actively-controlled split offset castors having embedded sensing and computation functions.

History of the Related Art

This section provides background information to facilitate a better understanding of the various aspects of the disclosure. It should be understood that the statements in this section of this document are to be read in this light, and not as admissions of prior art.

Movement of large payloads is common in the shipping and manufacturing industries. In the specific case of air and ocean transport, it is often necessary to maneuver large shipping containers to precise locations without impact or damage to surrounding items. Improper movement of a shipping container can damage the container, result in unstable packing of the container, and, in a worst case scenario, can result in the loss of the cargo or damage to the shipping vessel. Thus a need persists for methods and systems to provide controlled omni-directional movement to a payload.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

In one aspect, the present disclosure relates to a payload platform. The payload platform includes a platform and a castor assembly coupled to the platform. The castor assembly includes a body, a first wheel coupled to the body, and a second wheel coupled to the body. The first wheel and the second wheel are individually actuatable. A sensor is coupled to the body. A control unit is operably coupled to the sensor and operably coupled to the first wheel and to the second wheel. The sensor detects an area surrounding the platform, determines presence of obstacles, and transmits a signal to the control unit corresponding to the area surrounding the platform. The control unit directs the first wheel and the second wheel to rotate in a prescribed manner so as to achieve a prescribed movement of the platform.

In another aspect, the present disclosure relates to castor assembly. The castor assembly includes a body, a first wheel coupled to the body, and a second wheel coupled to the body. The first wheel and the second wheel are individually actuatable. A sensor is coupled to the body. A control unit is operably coupled to the sensor and operably coupled to the first wheel and to the second wheel. The sensor detects an area surrounding the body, determines presence of obstacles, and transmits a signal to the control unit corresponding to the area surrounding the body. The control unit directs the first wheel and the second wheel to rotate in a prescribed manner so as to achieve a prescribed movement of the platform.

In another aspect, the present disclosure relates to a method. The method includes detecting via a sensor, an area surrounding a payload platform. A desired movement of the payload platform is received via a control unit. Prescribed movement of a pivot point is computed, via the control unit. Prescribed rotation of a wheel associated with a castor assembly is computed via the control unit. A signal corresponding to the prescribed rotation of the wheel is transmitted, via the control unit, to the wheel. A desired movement of the payload platform is traversed, via the castor assembly.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

Figure 1:
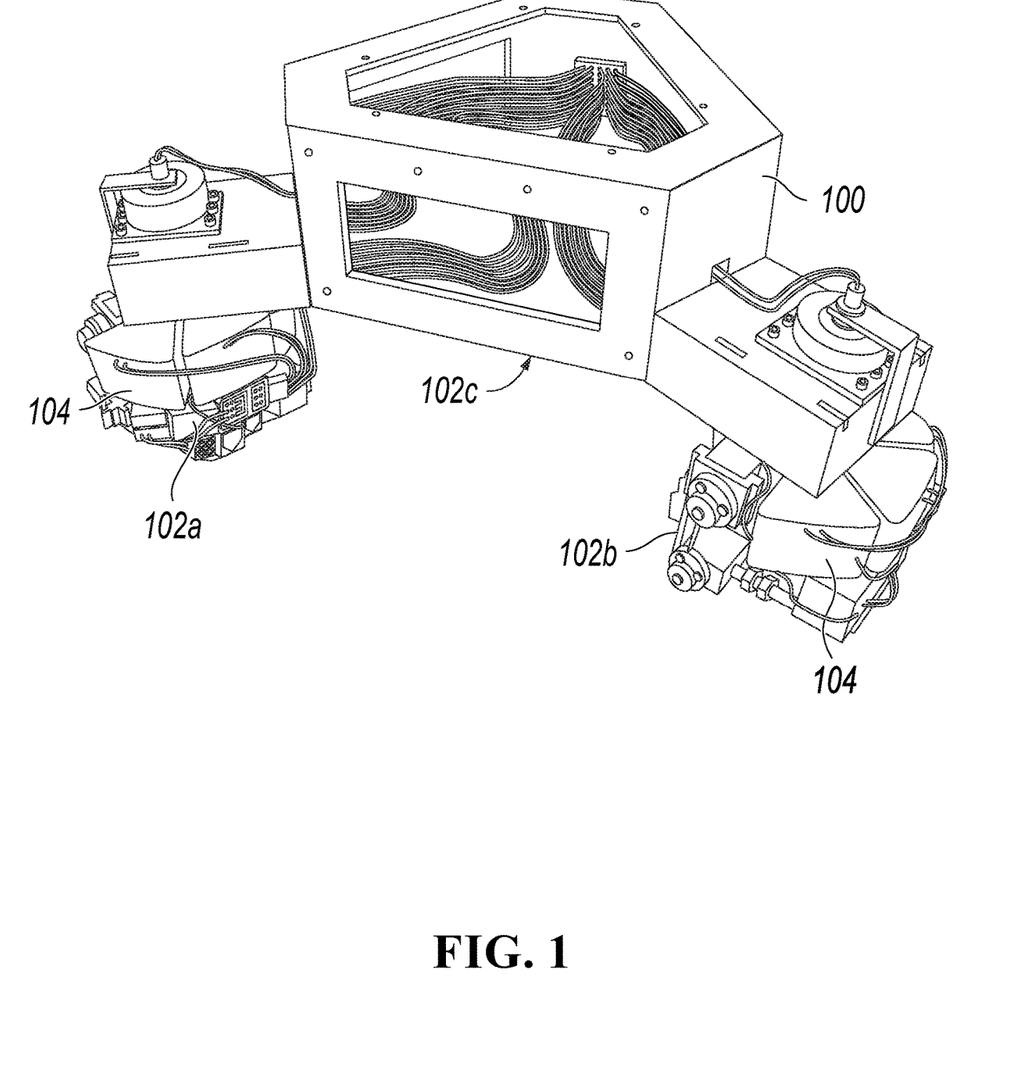
FIG. 1 is a perspective view of a payload platform having a plurality of castor assemblies in accordance with an exemplary embodiment.

FIG. 1 is a perspective view of a payload platform 100 having a plurality of castor assemblies 102 attached thereto. By way of example, the payload platform 100 is illustrated in FIG. 1 as being triangular in shape; however, in other embodiments that will be discussed hereinbelow, payload platforms utilizing principles of the disclosure could be any shape such as, for example, rectangular. A castor assembly 102 is attached at each vertex of the payload platform 100. In the embodiment illustrated in FIG. 1, three castor assemblies 102(a), 102(b), and 102(c) are utilized. The castor assemblies 102(a), 102(b), and 102(c) are independently powered and are independently controllable and actuated. In a typical embodiment, the castor assemblies 102(a), 102(b), and 102(c) are powered via battery arrays 104; however, in other embodiments, the castor assemblies 102(a), 102(b), and 102(c) may receive power from an external power source such as, for example, a payload disposed on the payload platform 100. In a typical embodiment, the castor assemblies 102(a), 102(b), and 102(c) together impart omni-directional motion to the payload platform 100. In the embodiments described herein, the parent body (e.g. a payload) has a prescribed rigid-body motion that is specific to an application of interest. From the prescribed motion, the prescribed motion of a castor assembly pivot point (illustrated as (D) in FIG. 2D) is computed. The geometry of the castor assembly 102 and the associated mapping illustrated in FIG. 2D then provides the wheel speeds consistent with the prescribed velocity of the point (D) and the roll without slop of the wheels on each castor assembly 102. In various alternative embodiments, the payload platform 100 may be altered to have a different shape. In such embodiments, the castor assemblies 102 could be positioned directly under the corners of a particular payload such as, for example, a shipping container. Commanding a plurality of castors such as, for example, three or more active castors consistent with the commanded velocity of the respective pivot points (D) ensures that a general, omni-directional motion ensues without the castors fighting each other.

Figure 2A:
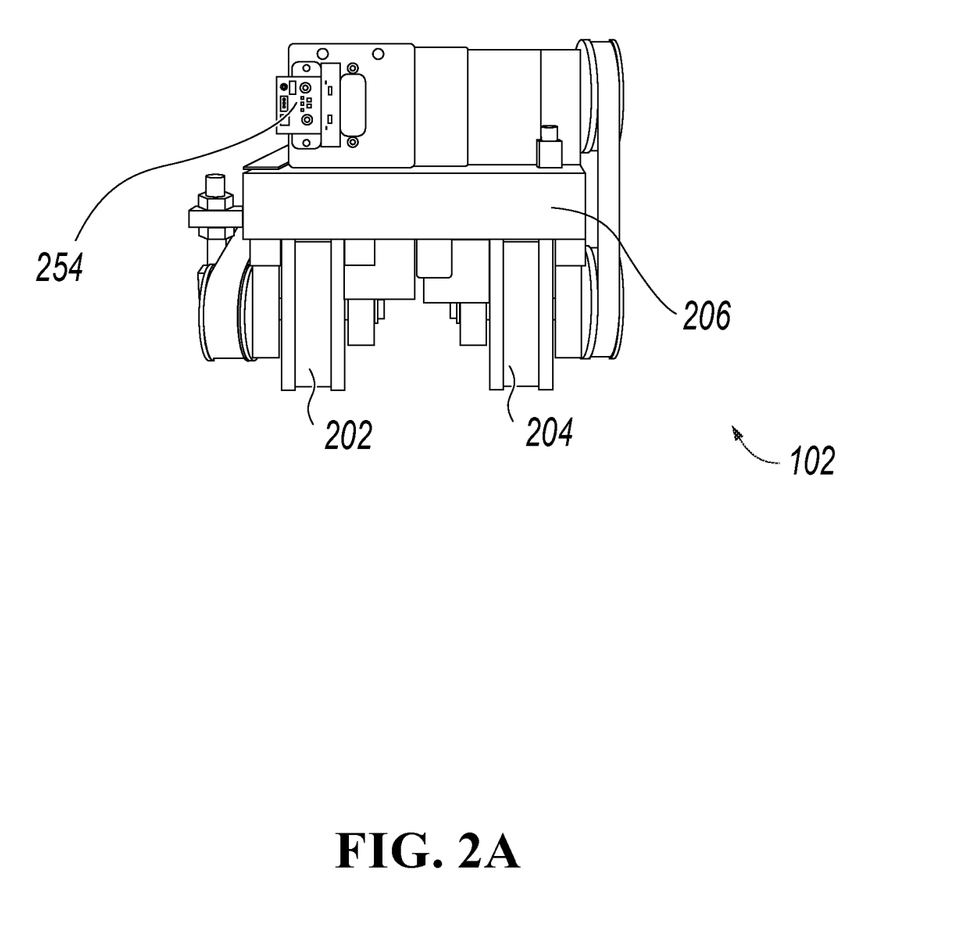
FIG. 2A is a front view of a castor assembly in accordance with an exemplary embodiment.
Figure 2B:
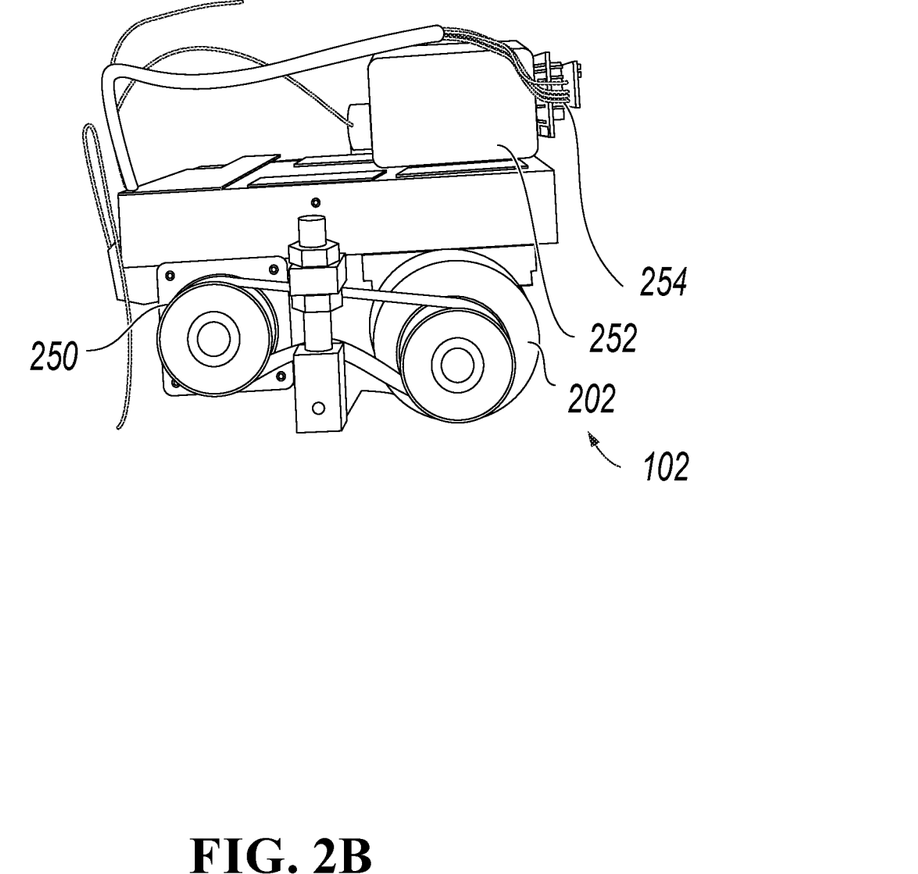
FIG. 2B is a side view of the castor assembly in accordance with an exemplary embodiment.
Figure 2C:
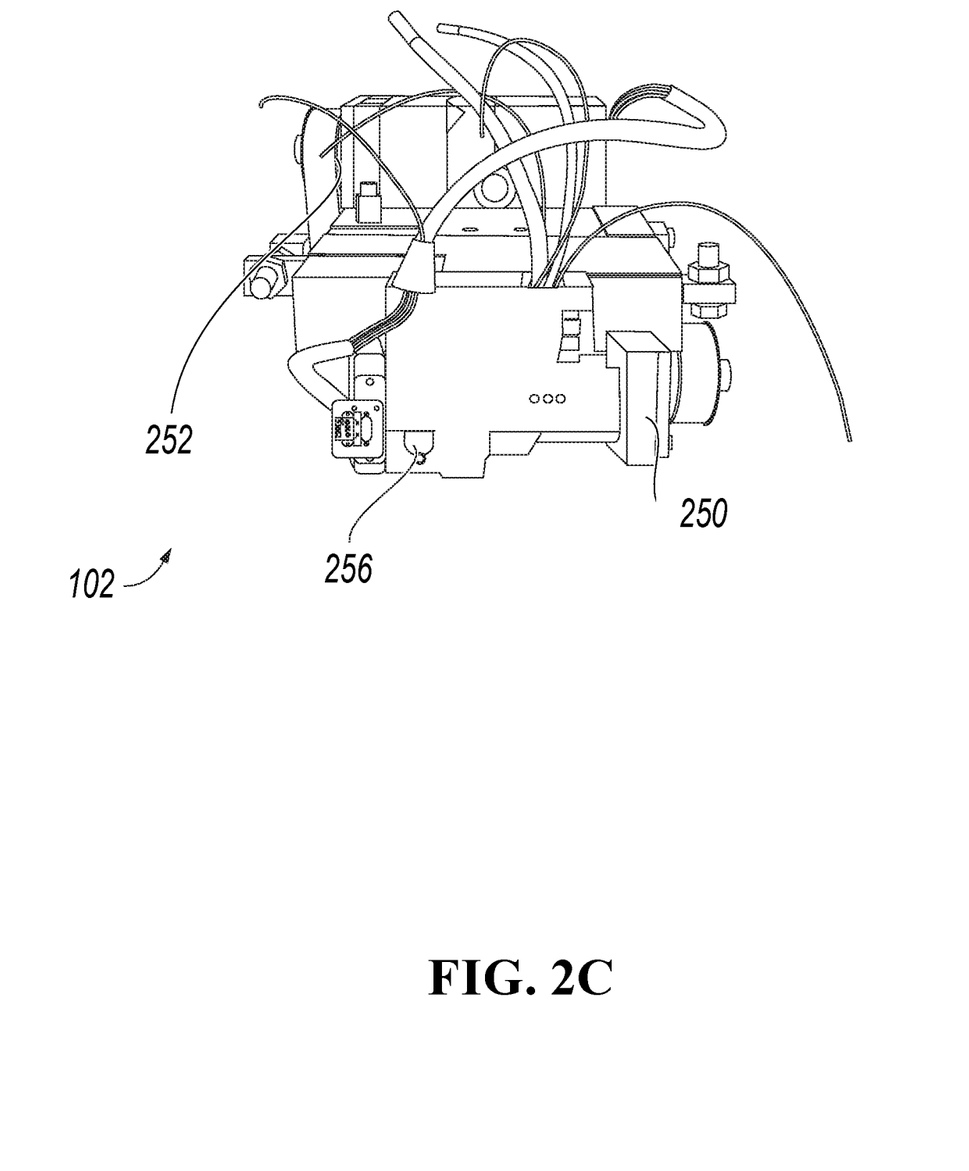
FIG. 2C is a rear view of the castor assembly in accordance with an exemplary embodiment.
Figure 2D:
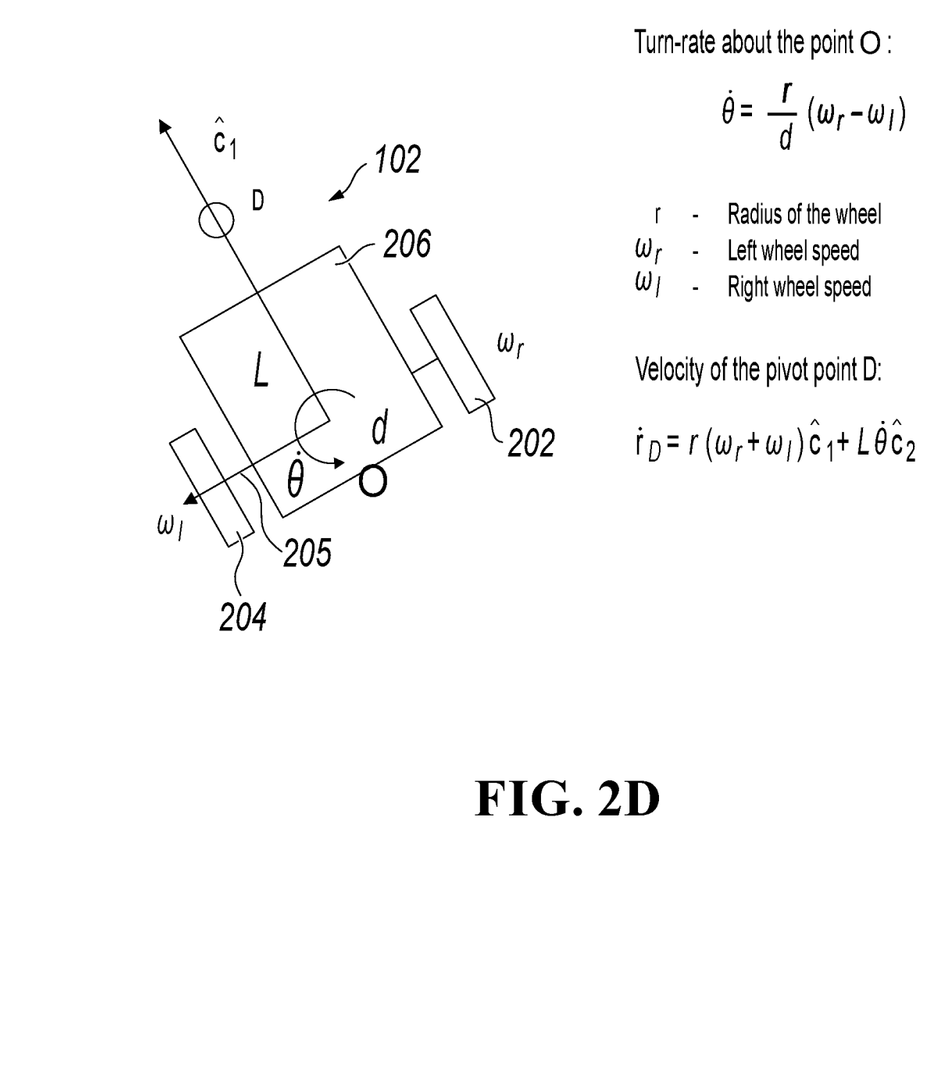
FIG. 2D is a schematic top view of a castor assembly in accordance with an exemplary embodiment.

FIG. 2A is a front view of a castor assembly 102. FIG. 2B is a side view of the castor assembly 102. FIG. 2C is a rear view of the castor assembly 102. FIG. 2D is a schematic top view of a castor assembly 102. Referring to FIGS. 2A-2D collectively, the castor assembly 102 includes a first wheel 202 and a second wheel 204. In a typical embodiment, the first wheel 202 and the second wheel 204 are of similar construction and comprise an equivalent diameter and coefficient of friction. The first wheel 202 and the second wheel 204 are independently controlled and may be actuated in a forward direction or in a backward direction at a variety of rotational speeds. The first wheel 202 and the second wheel 204 are rotatably connected to a body 206 and arranged such that a center of rotation of the first wheel 202 is on the same axis of rotation 205 as a center of rotation of the second wheel 204. Further, the first wheel 202 and the second wheel 204 are arranged such that the first wheel 202 rotates in a plane that is generally parallel to a rotational plane of the second wheel 204. The first wheel 202 and the second wheel 204 are displaced from a centerline of the body 206 by a distance, which is noted as (d) in FIG. 2D. The body 206 is rotatably coupled to the payload platform 100 at a pivot point (D). In a typical embodiment, the pivot point (D) is offset by a distance (L) from the axis of rotation 205 of the first wheel 202 and the second wheel 204.

Referring specifically to FIG. 2D, a turn rate ($\dot{\theta}$) about a center of rotation (O) of the body 206 is given by Equation 1:

$$\dot{\theta} = \frac{r}{d}(\omega_r - \omega_l)$$ Equation 1

Where (r) is the radius of the first wheel 202 and the second wheel 204, ($\omega_r$) is a rotational speed of the first wheel 202 and ($\omega_l$) is a rotational speed of the second wheel 204. The velocity of the pivot point (D) is given by Equation 2:

$$\dot{r}_D = r(\omega_r + \omega_l)\hat{c}_1 + \hat{\theta}\hat{i}_2$$ Equation 2:

Referring again to FIGS. 2A-2D, a first motor 250 is operably coupled to the first wheel 202 and a second motor 252 is operatively coupled to the second wheel 204. A first encoder 254 is positioned proximate the first wheel 202 so as to sense a rotational velocity of the first wheel 202 and convert the rotational velocity of the first wheel 202 into an electrical signal. Similarly, a second encoder 256 is positioned proximate the second wheel 204 so as to convert the rotational position of the second wheel 204 into an electrical signal. In a typical embodiment, the first encoder 254 and the second encoder 256 are electrically coupled to a control unit. In a typical embodiment, the control unit is a proportional, integral, derivative ("PID") control.

Figure 3:
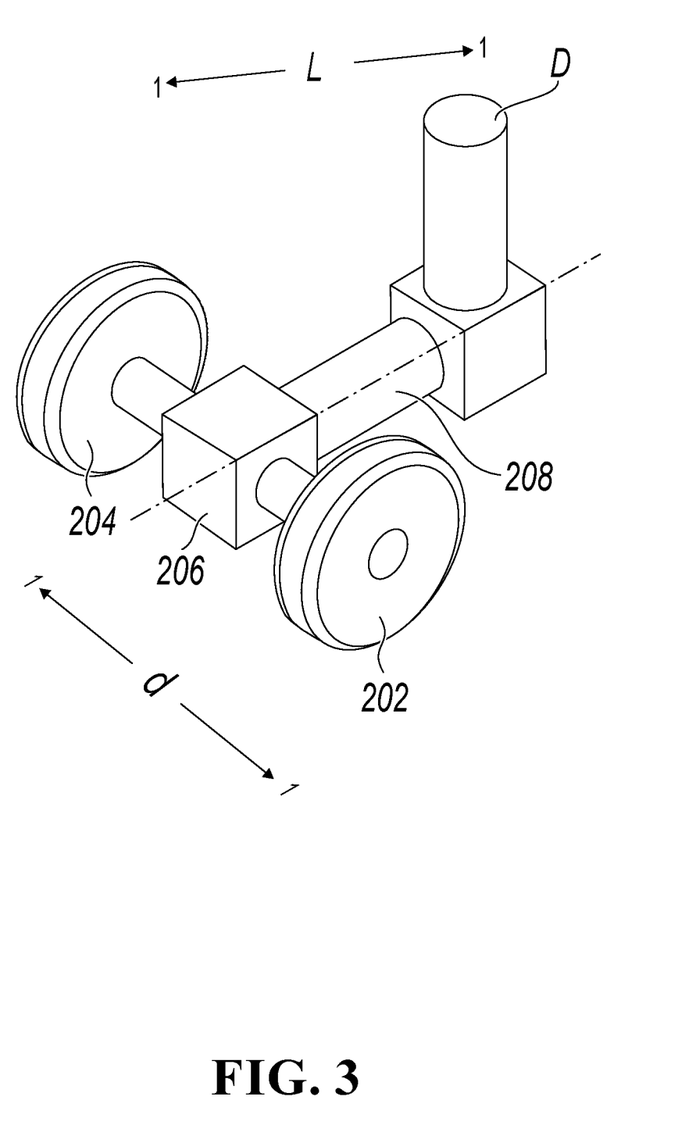
FIG. 3 is a schematic perspective diagram of a castor assembly in accordance with an exemplary embodiment.

FIG. 3 is a schematic diagram of a castor assembly 102. As previously discussed, the first wheel 202 and the second wheel 204 are separated from a centerline of the body 206 by a distance (d). The axis of rotation 205 of the first wheel 202 and the second wheel 204 is offset from a pivot point (D) by the distance (L). In a typical embodiment, the body 206, together with the first wheel 202 and the second wheel 204 is able to rotate about an axis 208. Thus, the body 206, the first wheel 202, and the second wheel 204 are able to rotate about the axis 208 in a plane that is generally orthogonal to a direction of travel of the first wheel 202 and the second wheel 204. Such rotation of the body 206 ensures that the first wheel 202 and the second wheel 204 will maintain contact with a surface in the event the payload platform encounters uneven areas in the surface.

Figure 4:
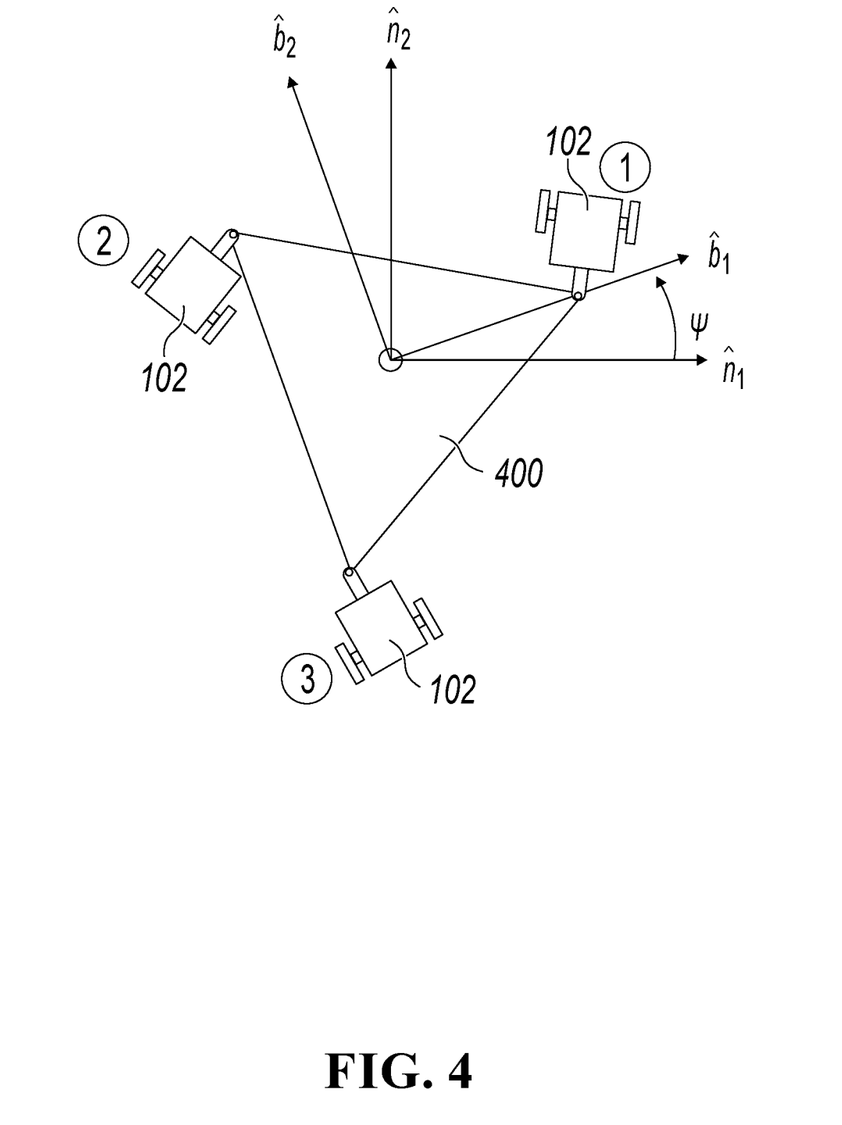
FIG. 4 is a schematic top view of a payload platform having three castor assemblies in accordance with an exemplary embodiment.
Figure 5:
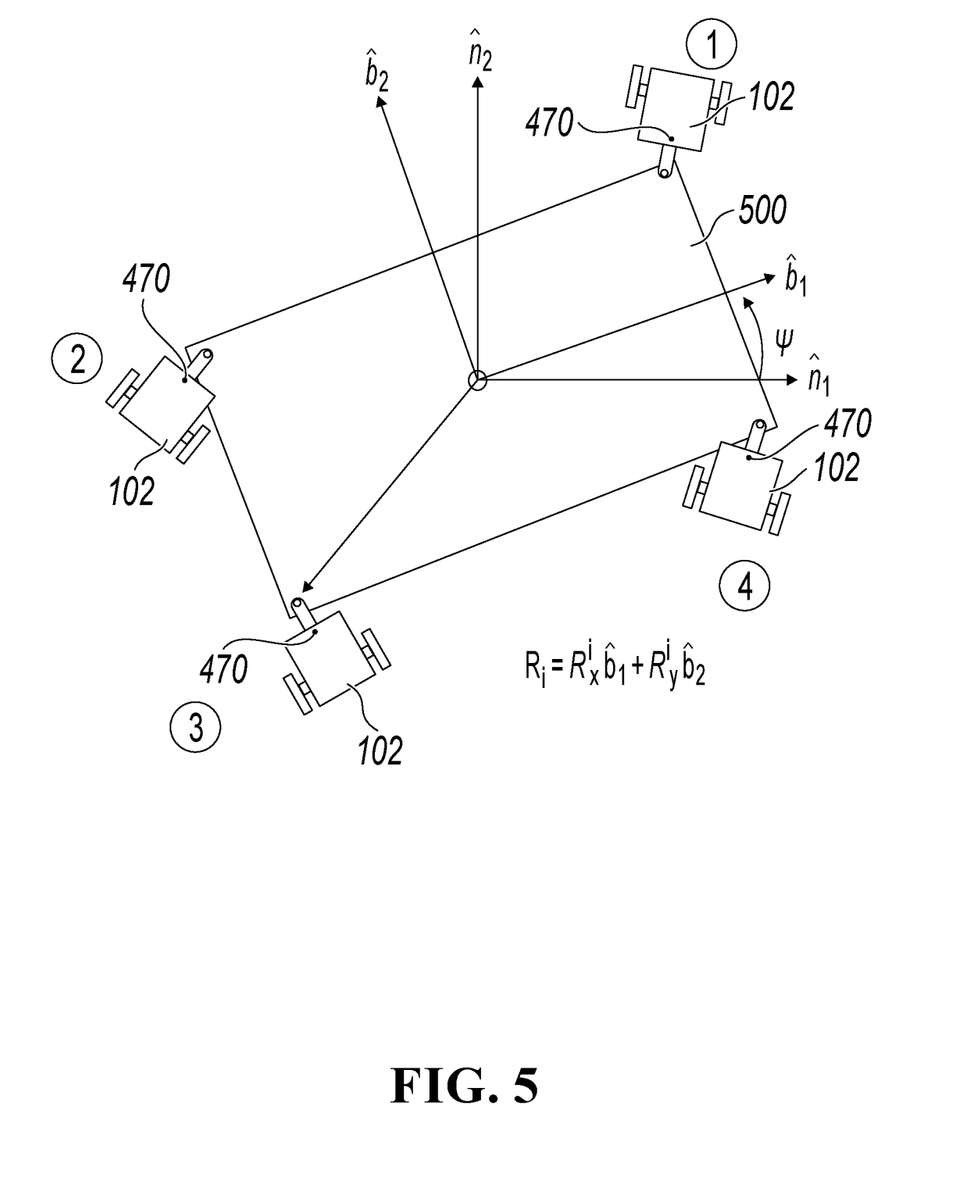
FIG. 5 is a schematic top view of a payload platform having four castor assemblies in accordance with an exemplary embodiment.

FIG. 4 is a schematic top view of a payload platform 400 having three vertices and three castor assemblies 102. FIG. 5 is a schematic top view of a payload platform 500 having four vertices and four castor assemblies 102. Referring to FIGS. 4-5 collectively, the castor assemblies 102 are located at vertices of the payload platform 400, 500 and are coupled to a control unit (not explicitly shown). The control unit receives a command related to a desired motion of the payload platform 400, 500. By way of example, the desired motion could include, for example two-axis translational motion or rotational motion about a vertical axis. In a typical embodiment, the control unit resolves the desired motion into translational and rotational components. The required velocity of each castor assembly 102 is then determined according Equation 3:

$$\begin{bmatrix} V_1 \\ V_2 \end{bmatrix} = \begin{bmatrix} \cos\psi & -\sin\psi \\ \sin\psi & \cos\psi \end{bmatrix} \begin{bmatrix} V_{cx}^1 + R_y^i \dot{\psi} \\ V_{cy}^1 + R_x^i \dot{\psi} \end{bmatrix}$$ Equation 3 where $\psi$ is the heading angle of the payload platform 400 (illustrated in FIG. 4), $R_y^i$ and $R_x^i$ are components of the position vector of the body 206 of the ith castor assembly 102 from an origin, $V_{cx}^i$ and $V_{cy}^i$ are prescribed wheel velocities expressed in a reference frame attached to the body 206 ($b_1$ and $b_2$ illustrated in FIG. 5). In similar fashion, the required speed of each wheel of each castor assembly is determined according to Equation 4:

$$\begin{bmatrix} V_{cx}^i \\ V_{cy}^i \end{bmatrix} = \begin{bmatrix} \cos\theta_i & -\sin\theta_i \\ \sin\theta_i & \cos\theta_i \end{bmatrix} \begin{bmatrix} r & r \\ L\frac{r}{d} & -L\frac{r}{d} \end{bmatrix} \begin{bmatrix} \omega_r^i \\ \omega_l^i \end{bmatrix}$$ Equation 4 where $\theta_i$ is the orientation of the ith castor assembly 102 with respect to the payload platform 400, 500, $\omega_r^i$ and $\omega_l^i$ are the angular velocity of the first wheel 202 and the second wheel 204 of the castor assembly 102. (assume positive rotation occurs when the thumb in the right-hand rule points towards $c_2$ in FIG. 2D, and L, r, and d are parameters associated with the geometry of the castor assembly 102 as illustrated in FIG. 2D. In this manner the castor assemblies 102 are capable of providing omni-directional motion to the payload platform 400, 500.

Still referring to FIGS. 4-5, a plurality of sensors 470 are disposed about the castor assembly 102 and, by installation, serve as ancillary sensors of the payload platforms 400, 500. In a typical embodiment, the plurality of sensors 470 are proximity sensors including, but not limited to range sensors such as, for example, radar, optical sensors, and laser-range sensors, optical sensors such as cameras, other motion/object detection sensors such as, for example, ultrasonic detectors, photodiodes, and inertial measurement units including accelerometers and rate gyroscopes. Mechanical devices such as, for example track balls and laser odometery systems may also be integrated into the plurality of sensors 470. Angular encoders at the pivot point (D) measure the heading angle of the castor assembly 102 with respect to a specified reference body direction such as, for example, $b_1$.

During operation, the plurality of sensors 470 detect the area immediately surrounding the payload platform 400, 500 and determine the presence of potential obstacles such as, for example, barriers to movement or other impact or instability risks. The plurality of sensors transmit this information to the control unit onboard each castor assembly 102. The control unit then plots a course from a present location of the payload platform 400, 500 to a desired location of the payload platform. The course is then reduced by the control unit to a series of movements to be traversed by the center of mass of the payload. This control logic is further broken down into individual castor differential velocity commands and communicated to corresponding castor assemblies. The command, control, and communication logics are accomplished by embedded computers integrated into each castor assembly 102. Wireless network established between the castors at the outset enables the command and control information exchange. In an embodiment, one of the castor assemblies 102 assumes a role of leader and carries out a guidance scheme of computing a series of movements for the payload and the individual castor velocities necessary to negotiate a payload traversal and reorientation process. The movements of the center of mass of the payload are further reduced to required movements of each castor assembly. Finally, the movements of each castor assembly are reduced by the control unit to rotational speeds of each wheel in the castor assembly. Additionally, each castor assembly is equipped with a measurement device 471. In a typical embodiment, the measurement device 471 is, for example, an inertial measurement unit ("IMU"); however, in other embodiments, the measurement device 471 is, for example, a laser measurement device, or a mechanical device such as, for example, a track ball. During operation, the measurement device 471 tracks rotational and translational movement of the castor assembly, converts the movement to an electrical signal, and transmits the electrical signal to the control unit.

Figure 6:
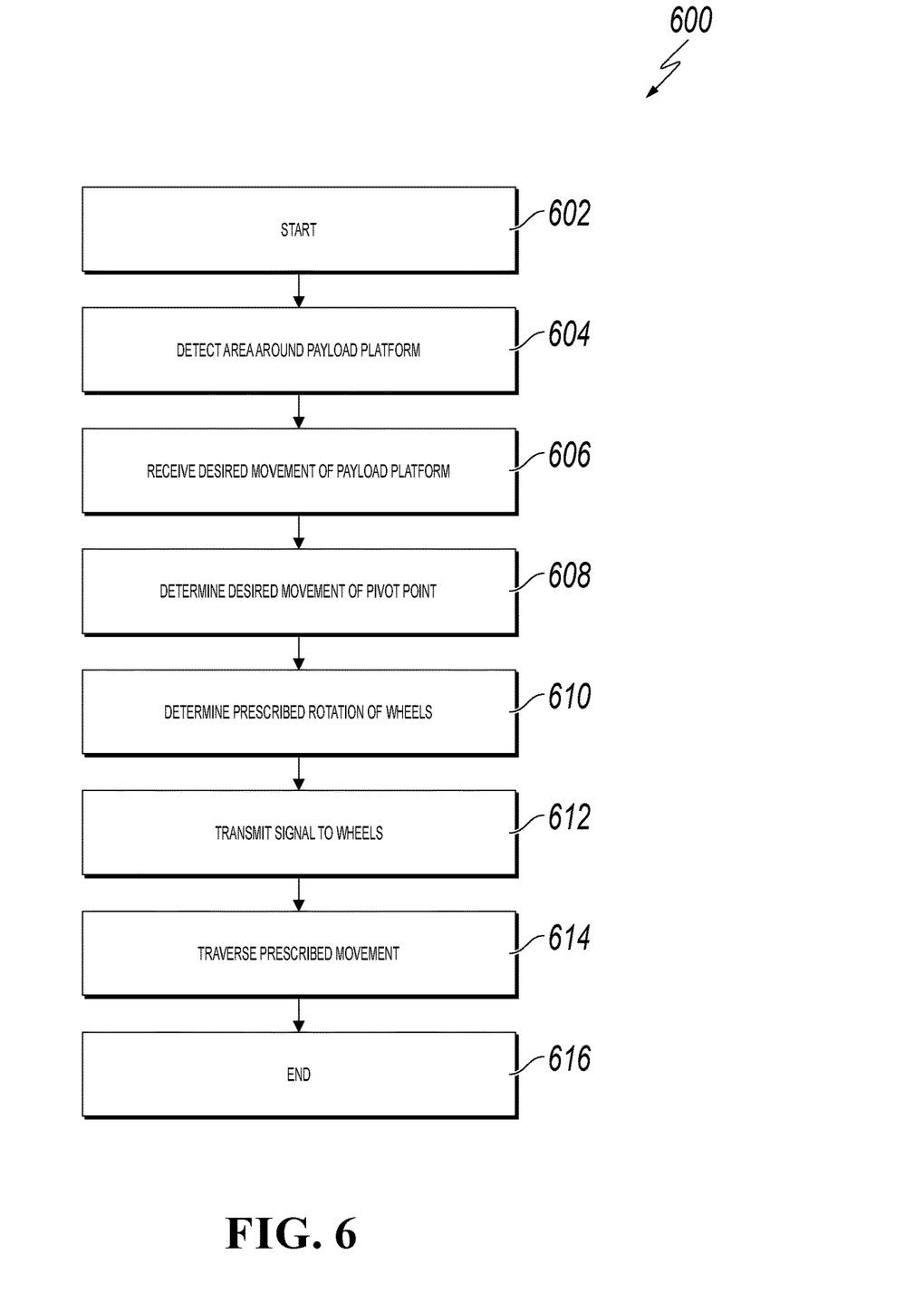
FIG. 6 is a flow diagram of a process for maneuvering a payload platform.

FIG. 6 is a flow diagram of a process 600 for maneuvering a payload platform 400. The process 600 starts at block 602. At block 604, the sensors 470 detect the area immediately surrounding the payload platform 400. At block 606, the control unit receives a desired movement of the payload platform 400. In various embodiments, the desired movement of the payload platform includes both rotational and translational movement. At block 608, the control unit determines a desired movement of a pivot point in order to execute the desired movement of the payload platform 400. At block 610, the control unit determines a prescribed rotation of a wheel associated with a castor assembly. In various embodiments, the wheel may be the first wheel 202 or the second wheel 204. At block 612, the control unit transmits to the wheel a signal corresponding to the prescribed movement. At block 614, a castor assembly causes the payload platform to traverse the prescribed movement of the payload platform 400. The process 600 ends at block 616. By way of example, the process 600 has been described herein relative to the payload platform 400; however, one of ordinary skill in the art will recognize that the process 600 could also apply to the payload platform 500.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A payload platform comprising:
    a platform;
    a castor assembly coupled to the platform, the castor assembly comprising:
        a body;
        a first wheel coupled to the body;
        a second wheel coupled to the body, the first wheel and the second wheel being individually actuatable, the body, the first wheel, and the second wheel rotate about an axis that is generally parallel to a direction of travel of the first wheel and the second wheel;
        a sensor coupled to the body;

a control unit operably coupled to the sensor and operably coupled to the first wheel and to the second wheel;

wherein the sensor detects an area surrounding the platform, determines presence of obstacles, and transmits a signal to the control unit corresponding to the area surrounding the platform; and wherein, the control unit directs the first wheel and the second wheel to rotate in a prescribed manner so as to achieve a prescribed movement of the platform.

2. The payload platform of claim 1, wherein the platform comprises a plurality of vertices and a plurality of castor assemblies, a castor assembly of the plurality of castor assemblies being disposed at each vertex.

3. The payload platform of claim 2, wherein the platform comprises three vertices.

4. The payload platform of claim 2, wherein the platform comprises four vertices.

5. The payload platform of claim 2, wherein each castor assembly of the plurality of castor assemblies is independently controlled.

6. A castor assembly comprising:
a body;
a first wheel coupled to the body;
a second wheel coupled to the body, the first wheel and the second wheel being individually actuatable, the body, the first wheel, and the second wheel rotate about an axis that is generally parallel to a direction of travel of the first wheel and the second wheel;
a sensor coupled to the body;
a control unit operably coupled to the sensor and operably coupled to the first wheel and to the second wheel;
wherein the sensor detects an area surrounding the body, determines presence of obstacles, and transmits a signal to the control unit corresponding to the area surrounding the body; and
wherein, the control unit directs the first wheel and the second wheel to rotate in a prescribed manner so as to achieve a prescribed movement of the platform.

7. The castor assembly of claim 6, wherein the first wheel and the second wheel are separated from a centerline of the body.

8. The castor assembly of claim 7, wherein the first wheel and the second wheel are separated from the body by an equal distance.

9. The castor assembly of claim 6, comprising:
a first encoder electrically coupled to the first wheel; and
a second encoder electrically coupled to the second wheel.

10. The castor assembly of claim 9, wherein the first encoder and the second encoder are electrically coupled to the control unit.

11. The castor assembly of claim 9, wherein the first encoder detects a rotational position of the first wheel and the second encoder detects a rotational position of the second wheel.

12. The castor assembly of claim 6, wherein the control unit is a proportional, integral, derivative control unit.

13. The castor assembly of claim 6, wherein the first wheel and the second wheel are offset from a pivot point of the body.

14. The castor assembly of claim 6, wherein the body, the first wheel, and the second wheel rotate in a plane that is generally orthogonal to a direction of travel of the first wheel and the second wheel.

15. The castor assembly of claim 14, wherein rotation of the body allows the castor assembly to traverse uneven surfaces.

16. A method comprising:
detecting via a sensor, an area surrounding a payload platform;
receiving via a control unit, a desired movement of the payload platform,
computing, via the control unit, prescribed movement of a pivot point;
computing via the control unit, prescribed rotation of a wheel associated with a castor assembly,
transmitting, via the control unit, a signal to the wheel corresponding to the prescribed rotation of the wheel;
traversing, via the castor assembly, a desired movement of the payload platform; and
wherein, the castor assembly rotates about an axis that is generally parallel to a direction of travel of the wheel.

17. The method of claim 16, wherein the computing comprises computing, via the control unit, prescribed rotation of a first wheel and a second wheel associated with the castor assembly.

18. The method of claim 17, wherein a rotational position of the first wheel is determined with a first encoder and a rotational position of the second wheel is determined with a second encoder.

19. The method of claim 16, the detecting comprises sensing obstacles proximate the payload platform.

20. The method of claim 19, wherein the traversing comprises avoiding the obstacles.

* * * * *